(12) United States Patent
Harrington (10) Patent No.: US 6,619,886 B1
(45) Date of Patent: Sep. 16, 2003

(54) SYSTEM AND METHOD FOR INSTALLING FORMED-IN-SITU LOCALIZED REPAIR OF PIPES AND CONDUITS

(75) Inventor: David R. Harrington, Canterbury (AU)

(73) Assignee: Sideliner Enterprises Pty Ltd, Springvale (AU)

( * ) Notice: Subject to any disclaimer, the term of this patent is extended or adjusted under 35 U.S.C. 154(b) by 0 days.

(21) Appl. No.: 09/586,335

(22) PCT Filed: Dec. 1, 1998

(86) PCT No.: PCT/AU98/00988
§ 371 (c)(1),
(2), (4) Date: Jun. 2, 2000

(87) PCT Pub. No.: WO99/28668
PCT Pub. Date: Jun. 10, 1999

(30) Foreign Application Priority Data

Dec. 2, 1997 (AU) ............................................. PP 0652

(51) Int. Cl.[7] .............................................. F16L 55/18
(52) U.S. Cl. .............................. 405/184.2; 405/150.1; 405/154.1; 405/184.1; 138/97; 138/98; 264/36.17; 264/516; 264/314; 156/94; 156/287
(58) Field of Search .............................. 405/146, 150.1, 405/150.2, 154.1, 184.1–184.3; 138/97, 98, 103–105, 108; 264/269, 257, 258, 267, 314, 516, 573, 36.16, 36.17, 36.22; 156/94, 156, 294, 295, 287

(56) References Cited

U.S. PATENT DOCUMENTS

| 4,368,091 A | * | 1/1983 | Ontsuga et al. ........... 138/98 X |
| 4,427,480 A | * | 1/1984 | Kamuro et al. ............. 156/287 |
| 5,280,811 A | * | 1/1994 | Catallo et al. ................ 138/98 |
| 5,388,616 A | * | 2/1995 | Muller et al. ................. 138/98 |
| 5,765,597 A | * | 6/1998 | Kiest, Jr. et al. ....... 156/294 X |
| 5,993,114 A | * | 11/1999 | Jones ....................... 405/150.1 |
| 6,050,300 A | * | 4/2000 | Schwert et al. ............... 138/98 |
| 6,105,619 A | * | 8/2000 | Kiest, Jr. ..................... 138/98 |
| 6,199,591 B1 | * | 3/2001 | Kiest, Jr. et al. ............. 138/98 |
| 6,244,846 B1 | * | 6/2001 | Keller ................. 405/150.1 X |

FOREIGN PATENT DOCUMENTS

| EP | 082212 | * | 6/1983 | .................. 138/97 |
| EP | 640787 | * | 3/1995 | .................. 138/97 |
| WO | 9208922 | * | 5/1992 | |
| WO | 9704269 | * | 2/1997 | |

* cited by examiner

Primary Examiner—Jong-Suk James Lee
(74) Attorney, Agent, or Firm—D'Ambrosio & Associates P.L.L.C.

(57) ABSTRACT

A method of installing a formed-in-situ repair in a pipe 40 comprising locating a sleeve of reinforcement material impregnated with a settable resin within a tube 36 of soft, impervious sheet material; everting the tube into said pipe such that the sleeve is carried into a desired zone and brought into intimate contact with its inner surface; guiding the point of eversion 43 of said tube through directional changes in the pipe with guiding means 21; maintaining the inflation of the everted tube while passing a heated fluid medium through its interior to accelerate curing of the settable resin; and, when the settable resin is cured, de-everting the tube with withdrawal means 19 and withdrawing it from the pipe, leaving the sleeve of reinforcement material in place within it.

55 Claims, 6 Drawing Sheets

SYSTEM AND METHOD FOR INSTALLING FORMED-IN-SITU LOCALIZED REPAIR OF PIPES AND CONDUITS

CROSS-REFERENCE TO PCT CASE

This is a National Stage application under 35 USC 371 of PCT/AU98/00988, filed Dec. 1, 1998 and based on Australian Patent Application No. PP1652, filed Dec. 2, 1997.

FIELD OF INVENTION

This invention relates to improvements in methods and apparatus for the formed-in-situ installation of localised repairs or reinforcements in pipes, conduits and the like. In particular, it relates to so-alled trenchless technology methods in which a repair or reinforcement is installed in a pipe or conduit by operating from one or more of its ends and without the need to expose or break it, and so-called soft repair systems in which a pipe or conduit is repaired or reinforced by the installation internally of a sleeve, formed in-situ from fibrous reinforcement material impregnated with a settable resin, said repair or reinforcement being maintained in position in intimate contact with the inner wall of the pipe of conduit during the process of curing said settable resin by the pressure of an inflated tube or bag.

BACKGROUND OF INVENTION

In the operation and maintenance of pipes and conduits, such as sewers, water mains, gas mains and the like, it is often necessary to effect repairs. Damage to such pipes and conduits in subterranean situations is most commonly caused by localised ground movement, by differential movement between main and tributary lines, by generalised corrosion and by erosion resulting from localised flow impingement. Modern environmental protection policies deem leakage from or into such pipes or conduits to be unacceptable and it is usual for operators to be required to repair such damage when it is detected. As a result, localised, in-situ repairs to subterranean and otherwise inaccessible pipes and conduits are frequently necessary and a variety of so-called trenchless technology methods have been developed for this purpose.

A particular problem in sewerage systems is the fracturing of tributary service connections at or close to the sewer main. While the sewer main is normally laid on a prepared foundation and, as a result, is positionally stable, service connections are merely laid in trenches and cut into the main if unplanned or connected to an oblique junction pipe if planned. Subsidence of the principal part of a service connection then causes it to fracture away from the part secured to the main. Other common forms of damage are the fracturing of boundary traps as a result of plunging by plumbers to clear blockages, differential settlement causing fractures in a line and inadequate jointing allowing penetration of tree roots.

A variety of methods have been developed for the localised in-situ repair of sewers. Where a repair is required in a pipe or conduit to which direct access is available, such as a sewer main, apparatus and method such as that disclosed in Australian Patent No. 35101/93 might be employed. This patent discloses an inflatable form upon which the settable resin-impregnated repair material is assembled, the whole then being winched into position at the proposed repair site. The inflatable form is then inflated with a flow of hot water, bringing the repair material into intimate contact with the inner wall of the sewer and maintaining it in position until curing is complete. The inflatable form is then deflated and withdrawn, leaving the cured repair in place. Where a repair is required to a tributary service connection, to which direct access is more difficult to obtain, apparatus and method such as that disclosed in Australian Patent No. 49722/93 might be employed. In this method, a launcher unit is positioned in a sewer main adjacent a tributary service connection opening. Fluid pressure is then employed to project a closed-ended tube of fibrous reinforcement material impregnated with a settable resin from the launcher and evert it into the service connection. Eversion pressure is sustained to maintain the repair material in place and in intimate contact with inner surface of the service connection until curing is complete. The launcher is then removed and the closed end of the repair cut out to re-open the service connection.

This latter method requires the tube of reinforcement material to be of sufficient length to extend from the sewer main to beyond the site of the repair. Therefore, although the repair itself may need to be only a meter or so in length to achieve its intended purpose, if the repair site is located some distance from the main, it must be made wastefully long. Additionally, if the site of the repair in the tributary service connection is remote from the sewer main, it may be necessary for the repair material, during its eversion, to traverse junctions and bends of small radius, such as traps. This cannot be achieved reliably by the method. Similar difficulties exist in attempting to position repair material from the service end of the tributary service connection.

SUMMARY OF INVENTION

The object of the present invention is to provide an apparatus and method for the reliable installation of localised, formed-in-situ repairs or reinforcements anywhere in an extended pipe, conduit or the like, regardless of the need to traverse junctions or bends of small radius and without the need to break said pipe, conduit or the like.

According to the present invention, a tube of soft, fibrous reinforcement material is impregnated with a settable resin and installed in the appropriate position within an installation sleeve made from a suitable soft, flexible and impervious material. Said reinforcement material is secured to the inner surface of said installation sleeve with a peelable adhesive or the like. Said installation sleeve is made with one closed end, to which is attached internally and extending through the length of said installation sleeve and for a suitable distance beyond its open end, a guiding means, such as a light, flexible and strong guide tape or cord. Attached externally to said closed end and with a length suitably exceeding that of said installation sleeve, is a light, flexible and strong withdrawing means, a retrieval tape or cord for example. Said closed end of said installation sleeve is provided with one or more calibrated vent openings.

The assembly of reinforcement material and installation sleeve is rolled onto a drum, commencing first with the free end of said retrieval tape or cord, followed by said installation sleeve which is wound on commencing with its said closed end. Said drum is then placed on a shaft within a closed, pressurisable container, said guide tape or cord and the open end of said installation sleeve being led out through a radially-positioned delivery tube, at the proximal end of which are provisions which act to collapse said installation sleeve into a compact form. Obviously, said drum might be left in place in said pressurisable container and said retrieval tape or cord and said installation sleeve connected to a short bridle led in through said delivery tube and attached to said drum and said assembly of installation sleeve and reinforcement material drawn in through said delivery tube and onto said drum by rotation of said drum. Said delivery tube comprises a short length fixed to said pressurisable container and one or more removable extension parts made in whatever length is required to reach an access opening into a tributary service connection to be repaired or reinforced. The open end of said installation sleeve is then securely and sealingly attached to the distal end of said delivery tube and said guide tape or cord is coiled outside the end of said delivery tube in preparation for its deployment. Following suitable cleaning of said tributary service connection, the distal end of said delivery tube is positioned in alignment with and in close proximity to the said access opening into the service end of said tributary service connection and said guide tape or cord is released into said tributary service connection and carried through it by a copious flow of water into the sewer main and thence downstream to the nearest manhole, where it is secured. If necessary, a light draw cord is first flushed through said tributary service connection and used to draw said guide tape or cord through behind it. Said pressurisable container is then pressurised with a cool pressurising medium and said drum controllably rotated in the appropriate direction, causing said installation sleeve, under the influence of the pressurised medium within said pressurisable container, to evert from said delivery tube directly into said access opening of said tributary service connection, the rate of eversion being regulated by a first operator controlling rotation of said shaft upon which said drum is supported and the pressure of said cool pressurising medium, the slack of said guide tape or cord being taken up by a second operator positioned at said downstream manhole in said sewer main. As said installation sleeve progressively everts through said tributary service connection, the pressure within said pressurisable container is transmitted throughout its everted length, which is inflated into intimate contact with the inner surface of said service connection, and continues to act upon the everting zone of said installation sleeve, thereby impelling the eversion of said installation sleeve and drawing with it through its interior its collapsed part which contains, in the appropriate location, said impregnated reinforcement material. Where the everting end of -said installation sleeve is required to traverse a feature in said service connection which imposes an impediment to its progression, tension applied by said second operator to said guide tape or cord assists it to do so. At the point where that part of the collapsed said installation sleeve containing said impregnated reinforcement material reaches said eversion zone of said installation sleeve, attached as it is to said installation sleeve by said strippable adhesive or the like, said reinforcement material is everted with said installation sleeve and is thereby brought into intimate contact with the inner surface of said tributary service connection, where it is maintained by the inflation of said everted part of said installation sleeve. Progressive eversion of said installation sleeve is then continued until its said closed end is fully everted, whereupon its movement ceases. Only said retrieval tape or cord passes along said delivery tube during the final stage of eversion of said installation sleeve. A flow of heated pressurising medium, such as steam, hot water or the like is then admitted to said pressurisable container, from whence it passes along the length of said everted installation sleeve to emerge at said calibrated vent openings in its said closed end, pressure within said installation sleeve being regulated to an appropriate figure by adjustment of the rate of inflow of said cool and heated pressurising media to said pressurisable container. The inflation pressure within said installation sleeve acts to maintain said impregnated reinforcement material in place in intimate contact with the inner wall of said tributary service connection whilst heat from said flow of heated pressurising medium acts to accelerate the curing of said settable resin with which said reinforcement material is impregnated. Where appropriate, tension is maintained on said retrieval tape of cord during the said curing process to restrain said installation sleeve against extension whilst it is heated and pressurised. When said settable resin with which said reinforcement material is fully cured, the flow of said pressurising media is terminated, said pressurisable container is depressurised and said installation sleeve is de-everted by tension applied to the proximal end of said retrieval tape or cord, said installation sleeve peeling away from said cured repair as its point of de-eversion progressively passes said cured repair. Said guide tape or cord is released at said downstream manhole and is drawn back with said installation sleeve. Said installation sleeve, guide tape or cord and retrieval tape or cord are then cleaned, inspected, repaired as required and stored for future use.

The various aspects of the present invention will be more readily understood by reference to the following description of preferred embodiments given in relation to the accompanying drawings in which:

DETAILED DESCRIPTION OF DRAWINGS

Figures 1, 2:
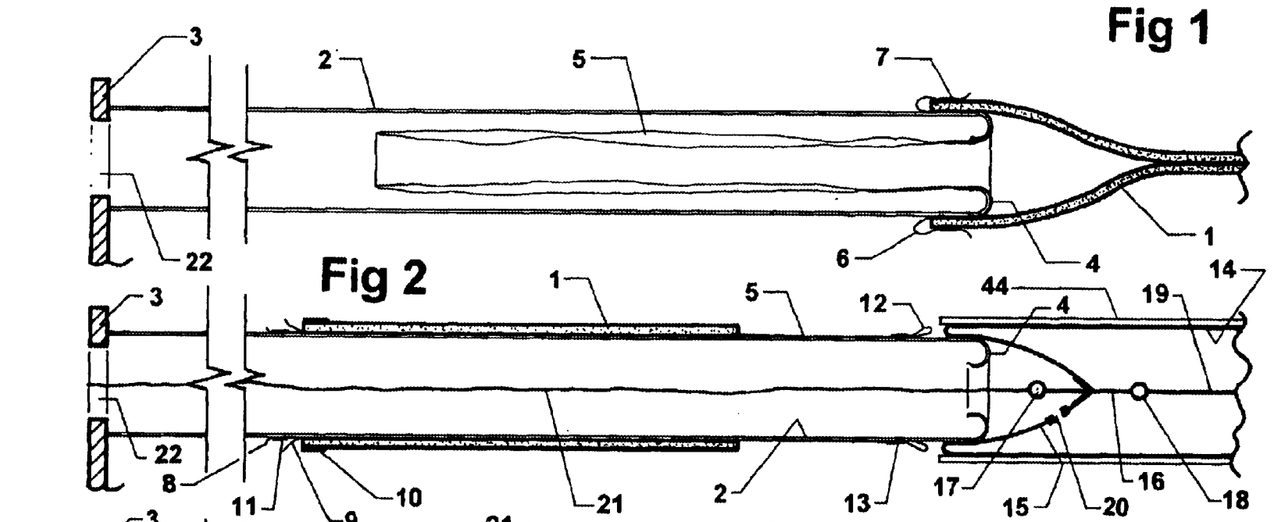
FIG. 1 is a longitudinal cross-sectional view of the assembly mandrel showing commencement of the first stage of introducing repair material into the installation sleeve.
FIG. 2 is a longitudinal cross-sectional view of the assembly mandrel showing commencement of the second stage of introducing repair material into the installation sleeve.
Figure 3:
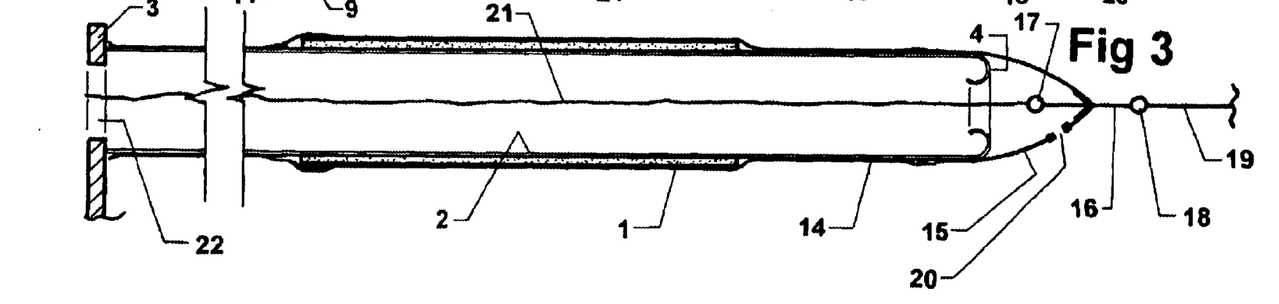
FIG. 3 is a longitudinal cross-sectional view of the assembly mandrel showing completion of the process of introducing repair material into the installation sleeve.

With reference to FIGS. 1, 2 and 3, assembly mandrel 2 is supported at a suitable working height from supporting structure 3, which is provided with aperture 22 allowing egress at that end from the interior of said assembly 2 mandrel. Said assembly mandrel is made a little longer than the greatest length of installation sleeve to be assembled on it, which, for all normal applications, does not exceed 15 meters. The free end of said assembly mandrel 2 is rolled inwardly to provide a radiused exit 4. A tube of thin, soft, sheet polymer material 5 is formed into an assembly shroud 5 by evertion along half of its length to bring its two ends into coincidence, where they are temporarily fastened together. The material from which said assembly shroud 5 is made is preferably but not necessarily polyethylene, to which the settable resins employed with the present invention adhere ineffectively. Said assembly shroud 5 is made sufficiently long to cover said assembly mandrel 2 more or less fully over the length between its free end and the end remote from it of reinforcement material 1 to be assembled on it as depicted in FIG. 2. Said assembly shroud 5 is inserted folded end first into the radiused exit of said assembly mandrel 2 until only a small part 6 of its length remains exposed, said exposed part being folded back over the end of said assembly mandrel.

Fibrous reinforcement material 1 is formed into a tube of a diameter to suit that of the pipe or conduit to be repaired. Preferably, said fibrous reinforcement material is formed from a sheet of needled polyester felt, which is soft and flexible, has good resin storage characteristics and resiles readily to its full thickness after compression. In alternative embodiments, said tube of fibrous reinforcement material is formed from a variety of woven, knitted or felted materials of a soft, flexible and elastic nature and with good capacity to store the settable resins with which it is to be impregnated. Where said reinforcement material is to be installed in a straight length of pipe or conduit, it is preferably made with an outer layer of some suitable soft, flexible, impervious, but durable material bonded to it and therefore has minimal elasticity. Where said reinforcement material is to be installed in a curved or convoluted length of pipe or conduit, said reinforcement material is made without said outer layer and is sufficiently elastic to accommodate said curves or convolutions without wrinkling or pleating. For all normal purposes, a degree of elasticity sufficient to permit a localised elongation of between 15 percent and 20 percent is satisfactory for the proper performance of the present invention.

A measured quantity of mixed settable resin and catalyst is injected into the interior of said tube of fibrous reinforcement material 1, which is then sealed within an impregnation sleeve formed from a suitable soft, flexible sheet material, thorough impregnation then being achieved by evacuation and rolling, a technique well known in the art. Preferably but not necessarily, said settable resin is vinyl ester, polyester or epoxy, all of which can provide suitable characteristics of pot life, chemical resistance, curing shrinkage, curing time and heat distortion temperature for the proper performance of the present invention.

After its removal from said impregnation sleeve, one end of said tube of impregnated reinforcement material 1 is then offered up to and positioned over the free end of said assembly mandrel as depicted in FIG. 1. The end part 6 of assembly shroud 5 is then drawn back over the end of said tube of impregnated reinforcement material and, where said reinforcement material is made with said impervious outer layer, is taped securely to it with adhesive tape or the like 7. Where said impregnated reinforcement material is made without said impervious outer layer, said end of said assembly shroud 5 adheres satisfactorily to said uncured resin with which it is impregnated. Said tube of impregnated reinforcement material is then slid onto said assembly mandrel 2, said assembly shroud 5 issuing progressively from the interior of said assembly mandrel 2 over radiused exit 4 and allowing said tube of impregnated reinforcement 1 material to slide freely over said assembly mandrel 2. When said tube of impregnated reinforcement material 1 is correctly positioned on said assembly mandrel 2, said fastened ends of said assembly shroud 5 are detached from said impregnated reinforcement material 1 and separated, the inner one 8 being securely fixed to the surface of said assembly mandrel by adhesive tape 11 or the like and the outer one 9 being left free and, if required, cut back almost to the end of said reinforcement material. With said tube of impregnated reinforcement material 1 correctly positioned on said assembly mandrel 2, the folded end 12 of said assembly shroud 5 is positioned at or near said free end of said assembly mandrel 2 and is fixed to the surface of said assembly mandrel 2 using some form of peelable adhesive attachment 13. With said tube of impregnated reinforcement material 1 correctly positioned on said assembly mandrel 2, if it is provided with said outer impervious layer, a ring 10 of double-sided adhesive material, with one sticky surface exposed outwardly, is positioned around the external circumference of its end remote from the free end of said assembly mandrel and further rings or patches 10 of the same material are similarly attached to its external surface in suitable positions along its length. If said tube of impregnated reinforcement material 1 is not provided with said outer impervious layer, strips or patches 10 of self-adhesive Velcro material are fixed to it in the same positions, the sticky self-adhesive surface of said Velcro material being orientated outwardly, and the hooked Velcro surface being orientated inwardly, the Velcro hooks engaging with and thereby attaching to the felted, matted, woven or knitted surface of said reinforcement material.

Installation sleeve 14 is made from a suitable thin, soft, flexible impervious material and is provided with a closed, reinforced end 15. Said closed end and adjacent zone, which may project into the lumen of a sewer main and, as a result, be unsupported whilst inflated, are reinforced with a strong, non-elastic material, of suitable length and sufficiently soft and flexible to permit complete eversion of said closed end in which one or more calibrated vent openings 20 are provided. Preferably, but not necessarily, said installation sleeve 14 is made in a form which permits a relatively high degree of circumferential elastic expansion but restricts axial elastic expansion to a range of between 15 and 20 percent. Conveniently, said installation sleeve is formed from a sheet of thin, soft, flexible, elastic and impervious material, into which a large plurality of axially arranged, fine, parallel, non-elastic reinforcing filaments is incorporated. Said reinforcing filaments follow a more or less regular sinuous path preferably but not necessarily with an amplitude of approximately two millimetres and a wavelength of six millimeters. As axial elastic extension of said installation sleeve 14 occurs, said sinuosity is progressively eliminated until, when said reinforcing filaments are fully straightened, axial elastic extension ceases. As said reinforcing filaments are made parallel and do not cross, they do not inhibit circumferential elastic expansion of said installation sleeve. Said installation sleeve may also be made by applying to a long sheet made from a single layer of suitable material a plurality of axially-oriented, narrow strips of self-adhesive, elastic polymer material, said strips being reinforced with a plurality of axially-arranged, fine, parallel, non-elastic reinforcing filaments. Said reinforcing filaments follow a more or less regular sinuous path preferably but not necessarily with an amplitude of approximately two millimeters and a wavelength of six millimeters. Said sheet of material, reinforced in this way, is then formed into tubular shape and closed by seam welding to form said installation sleeve. Made in this way, said installation sleeve 14 is capable of accommodating a relatively high degree of circumferential elastic expansion but with axial elastic expansion limited to a range of between 15 and 20 percent.

In an alternative embodiment, said installation sleeve 14 comprises two complete layers of thin, soft, flexible, impervious sheet material, the outer layer of which having a diameter of between 100 percent and 110 percent of the inside diameter of the said tributary service connection to be reinforced or repaired and made from reinforced material which, effectively, will not stretch. Within said outer layer is an inner layer having a diameter of between 75 percent and 90 percent of the inside diameter of said tributary service connection and made from unreinforced material preferably having sufficient elasticity to permit a localised elongation of between 15 percent and 20 percent. Preferably, said outer layer is made approximately 0.25 mm thick, said inner layer is made 0.4 mm thick and a suitable lubricating compound is applied between them to facilitate their independent movement when said installation sleeve is required to negotiate bends and convolutions.

In another alternative embodiment, where said installation sleeve 14 is to be employed solely to repair straight lengths of pipe or conduit, it is made in a single layer of reinforced, relatively inelastic material, the diameter of which is made equal to or slightly larger than the internal diameter of said tributary service connection into which said repair or reinforcement is to be installed.

In a further alternative embodiment, said installation sleeve 14 is made simply by inserting a piece of suitably elastic tube in an appropriate position between lengths of non-elastic tube, all being sealingly joined together end to end to create a continuous tube. The length of said elastic part is sufficient to accommodate said tube of impregnated reinforcement material and the diameter of both said elastic and non-elastic parts is preferably between 90 percent and 100 percent of the inner diameter of said tributary service connection to be repaired or reinforced. Said tube of impregnated reinforcement material is located in an appropriate position within said elastic part of said installation sleeve and secured as described in relation to the preferred embodiment. This embodiment suffers from the disadvantage that a separate said composite installation sleeve must be created for each specific application, which is both inconvenient and uneconomic.

In yet another alternative embodiment (not shown), said installation sleeve is made in the form of a continuous outer tube of some suitable soft, flexible, elastic material, inside which in appropriate positions are installed two or more lengths of tubing of some suitable soft, flexible, relatively inelastic material, the diameters of both said inner and outer tubes preferably being between 90 percent and 100 percent of the inner diameter of said tributary service connection to be reinforced or repaired. Said inner tubes are secured in position within said outer tube with double-sided adhesive material or the like and extend to all parts of said outer tube excepting that part in which said tube of impregnated reinforcement material is located and which is required to elastically expand, following its eversion, to urge said reinforcement material into intimate contact with the inner wall of said tributary service connection to be reinforced or repaired. The length of said outer tube between said inner tubes is sufficient to accommodate said tube of impregnated reinforcement material, which is secured within said outer tube in the manner described in relation to the preferred embodiment. This embodiment also suffers from the disadvantage that a separate said composite installation sleeve must be created for each specific application, which is both inconvenient and uneconomic.

All embodiments of said installation sleeve 14 are preferably made from either polyethylene or polyvinyl chloride material, to which said settable resins used with the present invention adhere ineffectively. In describing said alternative embodiments of said installation sleeve 14 comprising multiple layers of material, the adjectives 'inner' and 'outer', where they are used, describe the disposition of the layers of said installation sleeve 14 immediately prior to its eversion into said service connection.

Securely attached to said closed end of said installation sleeve 14 is short bridle 16, on each end of which are provided attachment fittings 17, 18, to the external one 17 of which guide tape or cord 21 is securely attached and to the inner one 18 of which retrieval tape or cord 19 is securely attached. Said guide tape or cord 21 and said retrieval tape or cord 19 are made from some suitable light, strong flexible material.

Said guide tape or cord is passed into the free end of said assembly mandrel 2 and along its length to emerge at aperture 22 where it is coiled for future deployment. Assisted by light inflation pressure, said installation sleeve 14 is everted over the free end of said assembly mandrel 2, commencing as depicted in FIG. 2, and its eversion is continued progressively until the situation depicted in FIG. 3 is achieved. As said installation sleeve 14 is progressively everted over said tube of impregnated reinforcement material, pressure is applied to its external surface to ensure that it is adhered to said tube of impregnated reinforcement material 1 by contact with the exposed sticky surfaces of double-sided adhesive pieces 10 or those of self-adhesive Velcro pieces 10. As said installation sleeve 14 is everted over said assembly mandrel, the free end of said retrieval tape or cord 19 is secured to minimise its interference with the movement of said installation sleeve 14. When said installation sleeve 14 has been fully everted onto said assembly mandrel, said retrieval tape or cord 19 is released and coiled for later deployment. With reference specifically to FIG. 2, to facilitate the eversion of said installation sleeve 14 over said assembly mandrel 2, a light tube 44 of some more or less rigid material and of suitable diameter is optionally placed over the outside of said installation sleeve 14 which is then lightly inflated into it. Said light tube 44 is then urged over said assembly mandrel 2, carrying said installation sleeve 14 with it.

Figure 14:
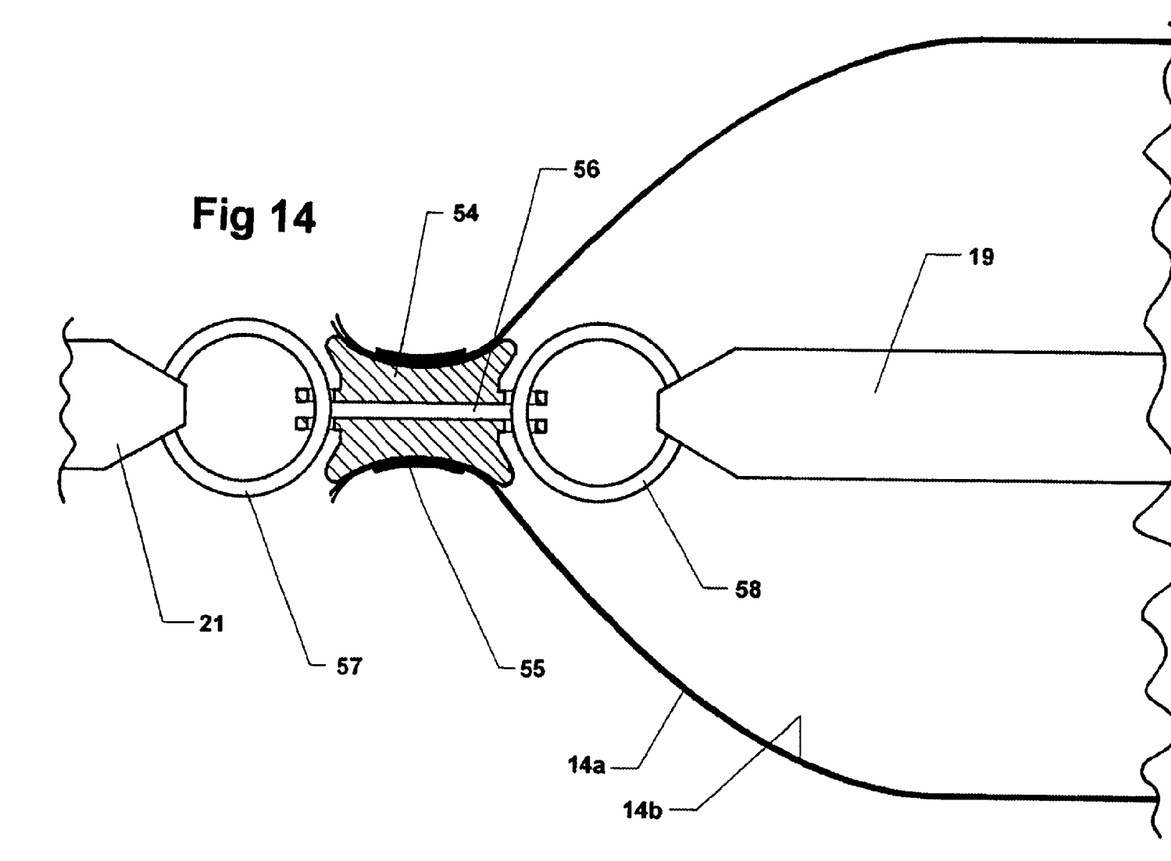
FIG. 14 is a longitudinal cross-sectional view of an alternative method of closing the distal end of said installation sleeve.

In an alternative embodiment (not shown), said tube of reinforcement material is drawn into its correct position inside said instillation sleeve with a suitable draw cord or tape before the distal end of said installation sleeve is closed using a method such as that described in relation to FIG. 14. Said draw cord or tape is attached to said tube of reinforcement material by spring clips, ties or the like which may readily be detached or severed when said tube of reinforcement material has been correctly positioned. With said tube of reinforcement material in its correct position inside said installation sleeve, pressure is applied to the outer surface of said installation sleeve to ensure that the outer surface of said tube of reinforcement material is engaged by the hooks of strips or patches of self-adhesive Velcro material which have previously been attached to the inner surface of said installation sleeve in the appropriate position during its manufacture. A measured quantity of mixed settable resin and catalyst is deposited through a hose into the zone in which said tube of reinforcement material is located. Said installation sleeve is then evacuated through the use of suitable suction equipment and the zone in which said reinforcement material is located isolated by the application of clamps across said installation sleeve at either end of said zone. Said tube of reinforcement material is then properly impregnated by passing said zone of said installation sleeve back and forth between rollers in the manner well known in the art. Conveniently, if said installation sleeve is transparent, the progress of said impregnation process may be observed. When said impregnation process is complete, said clamps are removed from said installation sleeve.

Figures 4, 5, 7:
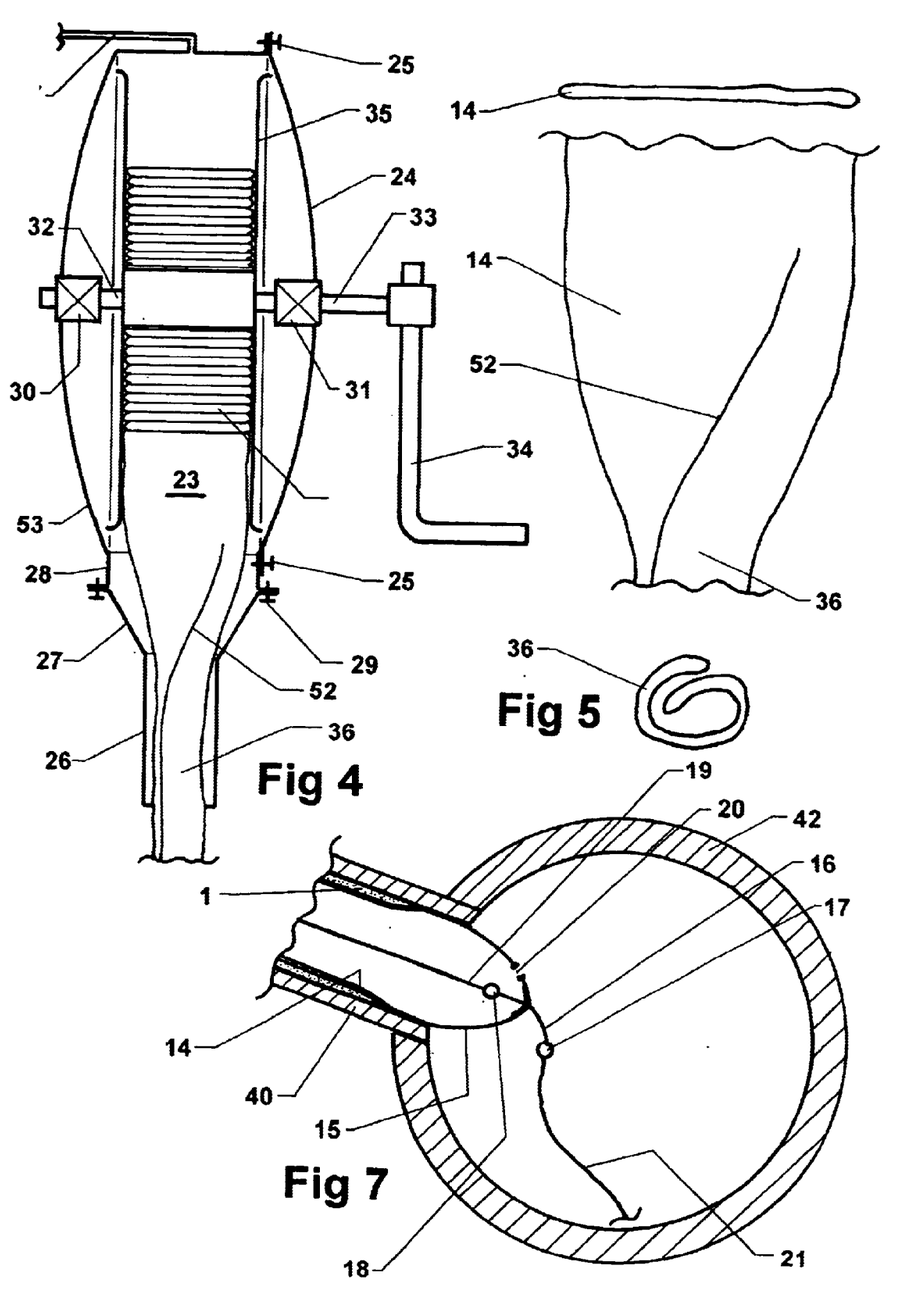
FIG. 4 is a cross-sectional view of apparatus employed to introduce the installation sleeve into a pipe or conduit.
FIG. 5 depicts the process of collapsing of the installation sleeve into a compact form to facilitate its introduction into a pipe or conduit.
FIG. 7 is a cross-sectional view through the junction of a tributary service connection with a sewer main showing final positioning of the distal end of the installation sleeve.

With reference to FIGS. 4 and 5, pressurisable container 23 is made with a readily removable end 24, secured in place by a plurality of fastenings 25. Bearing and seal assembly 30 is provided in fixed end 53 of said pressurisable container 23 and a similar assembly 31 is provided in said removable end 53. Shaft 32, 33 is sealingly and rotationally supported on said bearing and seal assemblies 30 and supported on said shaft is drum 35. Fixed to the end of said shaft is crank handle 34, by means of which said drum 35 may be rotated. Obviously, some form of remotely-controllable, power-operated drive means may be fixed to either pressurisable container end 23 or 24 and used to rotate shaft 32, 33 and thereby said drum 35. Fixed to the circumference of said pressurisable container 23 is short cylindrical extension 28, to the outer end of which conical member 27 is fixed with a plurality of fastenings 29. Delivery tube 26, which may be made as long as necessary to reach a particular work site, is formed on the outer end of said conical member 27. Obviously, said delivery tube may 26 comprise a plurality of joined members of convenient length. Hose or pressure line 37 is connected to said pressurisable container 23 and suitable pressurising media are supplied through this to pressurise its interior. A pressurising media source, valve and regulation means (not shown) are connected as required to said hose or pressure line. Preferably but not necessarily, said pressurising media are air and steam. Obviously, a pressurisable container 23 embodying the said features may take a variety of forms.

Shaft 33, bearing and seal assembly 31, end 24 and handle 34 are removable as an assembly, permitting drum 35 to be withdrawn from shaft 32 which remains in place supported by bearing and seal assembly 30. Said drum 35 is preferably prevented from rotating independently of shafts 32 and 33 by dogs or pegs (not shown) on said shafts 32 and 33 engaging complementary slots or recesses (not shown) in a bore passing through said drum 35.

When said installation sleeve 14 has been fully everted onto said assembly mandrel 2 as depicted in FIG. 3, said closed end of said installation sleeve 15 is pulled, causing said installation sleeve 14 to slide towards said free end of said assembly mandrel 2, together with said tube of impregnated reinforcement material 1. As said tube of impregnated reinforcement material 1 moves along said assembly mandrel 2, said assembly shroud 5 progressively de-everts, peelable adhesive attachment 13 releasing as tension is applied to it. During the removal of said installation sleeve 14 from said assembly mandrel 2, said coiled guide tape or cord is allowed to follow it by passing up through the interior of said assembly mandrel 2. As said installation sleeve is withdrawn from said assembly mandrel 2, said assembly shroud 5 peels away from the interior of said tube of impregnated reinforcement material 1 and remains attached to said assembly mandrel.

With said reinforcement material 1 installed in said installation sleeve 14 and impregnated with settable resin pre- or post-installation through use of the alternative methods described, drum 35 is removed from said pressurisable container 23, the distal end of said retrieval tape or cord 19 is attached to said drum 35 and said tape 19 is wound onto it, followed by said installation sleeve 14. Where said impregnated tube of reinforcement material 1 has been installed in said installation sleeve 14 using said assembly mandrel 2, said installation sleeve 14 is wound immediately onto said drum as it slides off said assembly mandrel 2, care being taken to remove all entrapped air from it by flattening it. Conveniently, this is performed by passing said installation sleeve 14 between rollers urged together by springs. Preferably, but not necessarily, the outer surface of said installation sleeve 14 is coated with a suitable lubricant material as it is wound onto said drum. Conveniently, said lubricant material is a sprayed silicone or Teflon lubricant. When said installation sleeve 14, carrying within it said tube of impregnated reinforcement material 1, has been fully wound onto said drum 35, said drum 35 is installed on shafts 32, 33 and said pressurisable container 23 closed by the fixing in place of removable end 24 with fastenings 25. The open end of said installation sleeve 14 is led out through conical member 27 and delivery tube 26. With additional reference to FIG. 5, the purpose of conical member 27 is to reshape tube of impregnated reinforcement material 14 from its flattened form as it is delivered from drum 35 into a collapsed form 36 by generation of a fold 52. If necessary, folding members (not shown) are provided in said conical member 27 for this purpose, such folding members being well known in the art.

Obviously, said pressurisable container 23 may be left closed with said drum 35 in place within it and with a short bridle 16 passing into said pressurisable container 23 through said conical member 27 and said delivery tube 26, the distal end of said retrieval tape 19 or cord being attached to said bridle 16 and said retrieval tape 19 or cord being drawn into said pressurisable container 23 and onto said drum 35 by rotation of shaft 32, 33, followed by said installation sleeve 14.

Figure 6:
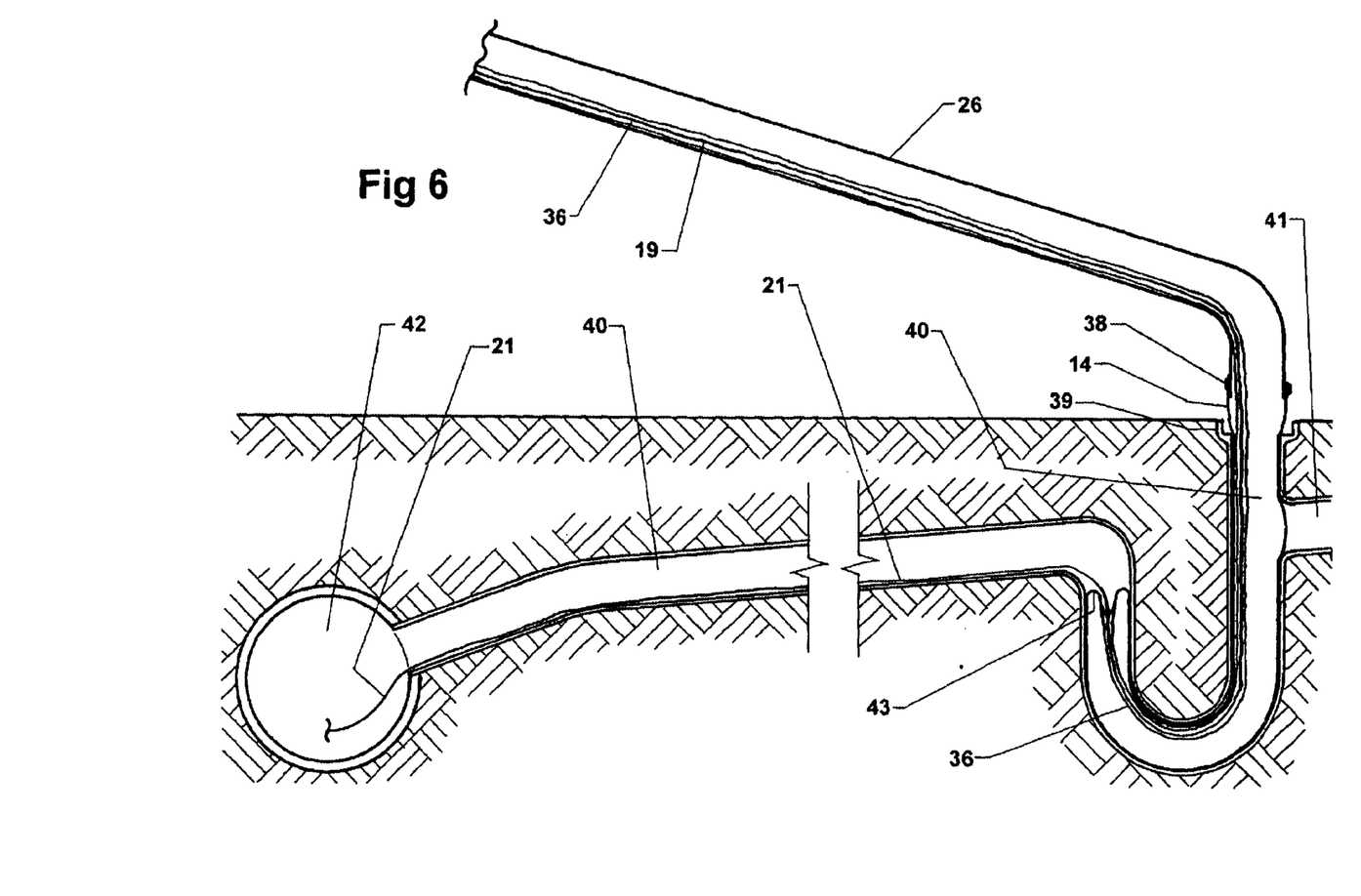
FIG. 6 is a cross-sectional view through a localised sewer system showing the installation sleeve partially introduced into it.

With the desired length of delivery tube 26 fixed to said pressurisable container 23, the end of collapsed tube of impregnated reinforcement material 36 is opened out, turned back over the distal end of said delivery tube and securely clamped to it with clamp 38, as depicted in FIG. 6. Coiled said guide tape 21 or cord is led out through said conical member 27 and said delivery tube 26 together with the end of said installation sleeve 14 and the surplus length coiled for later deployment. Said distal end of said delivery tube 26 is then positioned coincident with an access opening into a tributary service connection in which a said repair or reinforcement is to be installed.

Guide tape or cord 21 is uncoiled and released into said tributary service connection together with a copious flow of water and is carried down to sewer main 42 through which it passes to the next down-stream manhole, where it is secured. If difficulty is experienced in so positioning said guide tape 21 or cord, a light draw cord is passed through in a similar way and used to draw said guide tape 21 or cord into position.

With reference to FIGS. 4, 6 and 7, the interior of said pressurisable container 23 is pressurised, preferably with a cool pressurising medium, to a pressure of between 50 and 150 kPa and this pressure is transmitted throughout the open part of said installation sleeve 14 to its everted end, urging it towards continued eversion, whilst acting to maintain its collapsed part in its compact form. Rotation of drum 35 in the appropriate direction progressively releases installation sleeve 14 from said drum 35, from whence it passes out through delivery tube 26, being progressively collapsed into its compact form 36 as it passes through conical member 27, and everts into the opening 39 of tributary service connection 40, in coincidence with which the distal end of said delivery tube 26 has been positioned. Further rotation of said drum 35 and regulation of the pressure of said cool pressurising medium by a first operator allows continuation of the eversion of said installation sleeve 14 into said tributary service connection 40, collapsed part 36 of said installation sleeve 40 passing through said delivery tube 26 and along the already everted part of said installation sleeve 14 to evert itself at eversion point 43. Said lubricant material applied to the outer surface of said installation sleeve 14 acts to minimise friction between said collapsed and already everted parts of said installation sleeve 14 as the former passes through the latter.

As said installation sleeve 14 progressively everts, the pressure of said cool pressurising medium against it inflates said installation sleeve 14 and urges it outwardly into intimate contact with the inner surface of said tributary service connection 40 into which it is being everted.

As said installation sleeve 14 progressively everts into said tributary service connection 40, the slack in said guide tape 21 or cord is taken up by a second operator positioned at said downstream manhole of said sewer main 42. Should the eversion point 43 of said installation sleeve 14 encounter resistance whilst transitioning a bend, trap or junction, said second operator applies tension to said guide tape 21 or cord to assist it in the transition. Said eversion point of said installation sleeve 14 readily transitions tributary openings 41. It should be noted that, although delivery tube 26 is depicted in FIG. 6 as being more or less the same diameter as tributary service connection 40, it may, in fact, be made with a smaller diameter.

As said eversion point of said installation sleeve 14 approaches the position in which said repair or reinforcement is to be installed, the adhesion of rings and strips of double-sided adhesive or of rings and strips of self-adhesive Velcro material 10 (as depicted in FIG. 2) acts to cause the end of said tube of impregnated reinforcement material 1 to follow said installation sleeve 14 and commence eversion, its inner surface then being progressively brought into contact with the inner surface of said tributary service connection 40 and its said outer surface being progressively transferred to its interior as it continues to evert. Where said impervious layer is provided on said tube of resin impregnated reinforcement material 1, in the everted position of said reinforcement material it forms a durable protective working surface. After completion of its eversion, said tube of resin impregnated reinforcement material 1 is maintained in position in intimate contact with the inner surface of said tributary service connection 40 by the inflation pressure of said installation sleeve 14. Progressive eversion of said installation sleeve 14 is then continued until its closed end 15 is fully everted, with only retrieval tape or cord 19 being released from drum 35 during the final stages of the eversion process.

Where, in the alternative embodiment described, said installation sleeve 14 is made in composite form from lengths of elastic and non-elastic tubing joined end to end, as said installation sleeve 14 progressively everts, its said non-elastic parts are inflated by the pressure of said cool pressurising medium into contact with the inner surface of said tributary service connection 40. Following its eversion together with said and said tube of impregnated reinforcement material 1, said elastic part is similarly inflated, stretching to apply a smooth force against said tube of impregnated reinforcement material 1 to urge it into intimate contact with the inner surface of said tributary service connection 40.

Following completion of eversion of said installation sleeve 14, a flow of heated pressurising medium is progressively admitted into said pressurisable container through hose or pressure line 37, the flow of both cool and heated pressurising media being regulated to maintain proper inflation pressure of said installation sleeve 14 as said calibrated vent openings in said closed end of said installation sleeve 14 are exposed. With said flow of heated pressurising medium established, the supply of said cool pressurising medium to said pressurisable container 23 is continued as required to maintain proper inflation of said installation sleeve 14. Heat from said flow of heated pressurising medium, passing along the length of said installation sleeve 14 and out through said calibrated vent openings in its said closed end, acts to accelerate the curing of said settable resin in said repair or reinforcement. Where said installation sleeve 14 is made from unreinforced material capable of considerable elastic extension, during said curing process, tension is maintained as required on said retrieval tape 19 or cord to restrain any tendency for said installation sleeve 14 to elongate whilst heated and pressurised. Where required, said retrieval tape 19 is made with a width approximately one quarter of the circumference of said installation sleeve and tension applied to it urges it against the inner curve of any convoluted member of a pipe or conduit to be repaired or reinforced, thereby acting to suppress any tendency towards pleating of said installation sleeve 14 and said tube of impregnated reinforcement material 1 in that area. Where said tube of impregnated reinforcement material 1 is made of sufficient length to provide adequate frictional attachment to the inner surface of said tributary service connection 40, its attachment to said installation sleeve 14 as described and depicted in relation to FIGS. 2 and 3 may be sufficient to restrain said installation sleeve 14 against any tendency for it to elongate whilst heated and pressurised.

Said flow of heated pressurising medium is provided purely to accelerate the curing of said settable resin. Obviously, the use of said flow of heated pressurising medium may be dispensed with and said settable resin formulated to cure at ambient temperatures, the extended curing time being tolerated.

Obviously, where said installation sleeve 14 is made wholly of reinforced or non-elastic material or in the preferred embodiment described formed from two layers, one of which is made of non-elastic material, it has no tendency to elongate whilst heated and pressurised and there is therefore no requirement to maintain tension on said retrieval tape or cord during the curing process.

Obviously, also, an indication of the temperature within the distal end of said installation sleeve following its eversion and during curing of said resin-impregnated reinforcement can be obtained by providing conductors within said retrieval tape or cord connected at the distal end of said installation sleeve to a thermocouple or other heat sensitive device and connected at said pressurisable container to a temperature indication device. Obviously, also, a pressure gauge may be provided on said pressurisable container to indicate pressure within its interior and a flow meter to register total volume flow of cool and heated pressurising media into said pressurisable container through line 37 as depicted in FIG. 4.

When said settable resin in said repair or reinforcement is properly cured, said flow of cool and heated pressurising media is terminated. Said installation sleeve 14 is withdrawn from said tributary service connection 40 by tension applied to the, distal end of said retrieval tape 19 or cord, said installation sleeve 14 progressively de-everting and passing back through its own interior, said guide tape 21 or cord, which has been released at said downstream manhole, following. As the de-eversion point of said installation sleeve 14 passes said cured repair or reinforcement, said installation sleeve peels 14 cleanly away from it. Preferably, during the process of de-eversion of said installation sleeve 14, a light inflation pressure is maintained within said installation sleeve to minimize any tendency towards bunching or wrinkling and thereby facilitate its movement.

Said installation sleeve 14, said retrieval tape 19 or cord and said guide 20 tape or cord are then cleaned, inspected, repaired as required and packed for future use.

Figures 9, 10, 11:
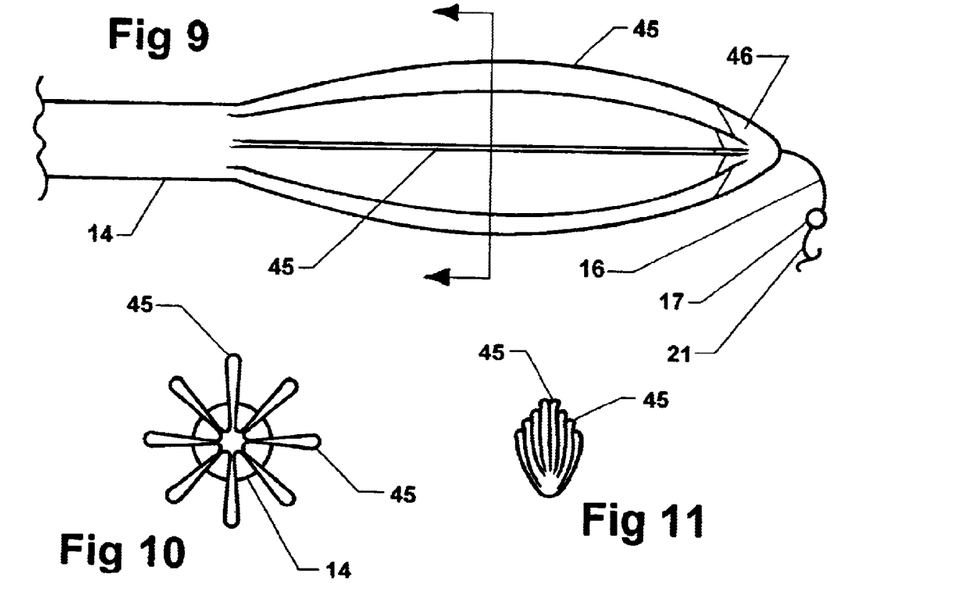
FIG. 9 is a side view of the distal end of the installation sleeve in an alternative embodiment.
FIG. 10 is a transverse cross-sectional view of the arrangement depicted in FIG. 9, sectioned as shown in that figure.
FIG. 11 is a transverse cross-sectional of the arrangement depicted in FIG. 10, collapsed into a compact form.

With reference to FIGS. 9, 10 and 11, in an alternative embodiment in which the end of said tube of impregnated reinforcement material is carried out of the end of said lateral service connection and for a short distance into said sewer main in order to create a stronger repair or reinforcement, installation sleeve 14 is made with a distal end able to be inflated into a more or less spherical form of substantially greater diameter than that of the generality of said installation sleeve and of sufficient diameter to fully fill the lumen of said sewer main. The apex (in its collapsed form) of said distal end incorporates reinforcement 46 made of a material sufficiently soft and flexible to permit its complete eversion. Attached to said reinforcement is short bridle 16, on one end of which is provided attachment fitting 17 to which is securely attached guide tape or cord 21. On the other end of said short bridle is provided an attachment fitting (depicted as 18 in FIGS. 2 and 3), to which is securely attached said retrieval tape or cord (depicted as 19 in FIGS. 2 and 3), neither feature being shown in this Figure. One or more calibrated vent openings (not shown) are provided in said distal end of said installation sleeve. In its uninflated form, said distal end is arranged to collapse into a plurality of pleats 45. FIG. 10 depicts a transverse cross-sectional view of said distal end sectioned through the plane indicated in FIG. 9. In its said uninflated form, said distal end may be further collapsed into a more compact form by the folding together of said pleats as depicted in FIG. 11 in a transverse cross-sectional view sectioned through the same plane as depicted in FIG. 10. In its fully collapsed form, said distal end of said installation sleeve, during the process of eversion of said installation sleeve, is readily able to pass along the interior of its already everted part.

Figure 12:
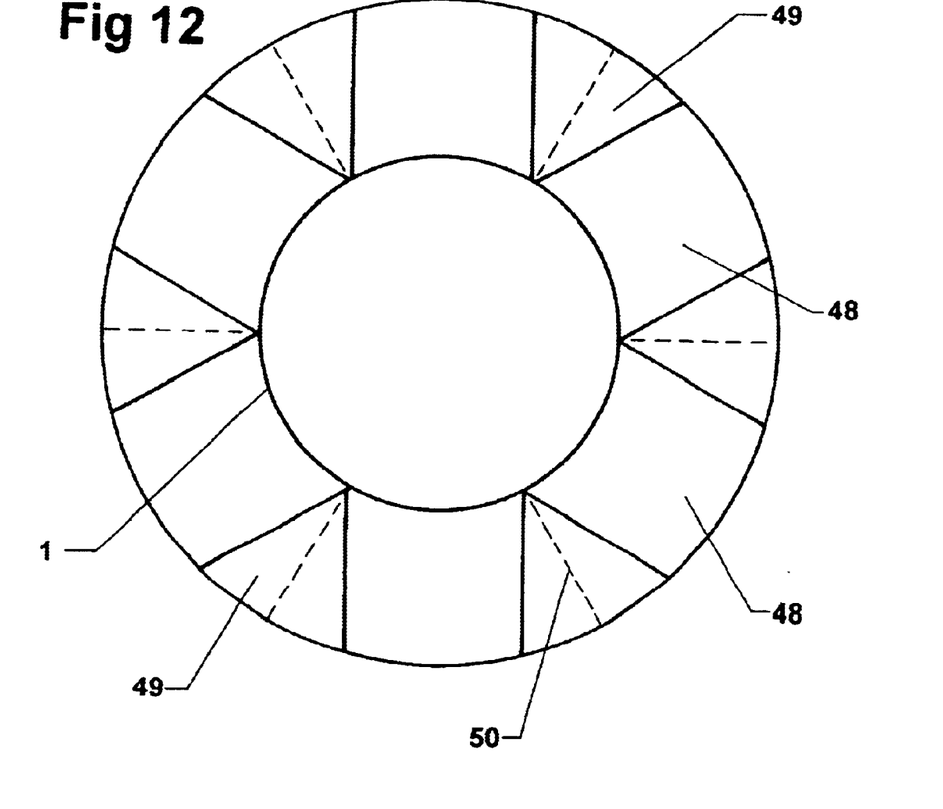
FIG. 12 is a view of the end of said impregnated reinforcement material in an alternative embodiment in which it is formed into a flange.
Figure 13:
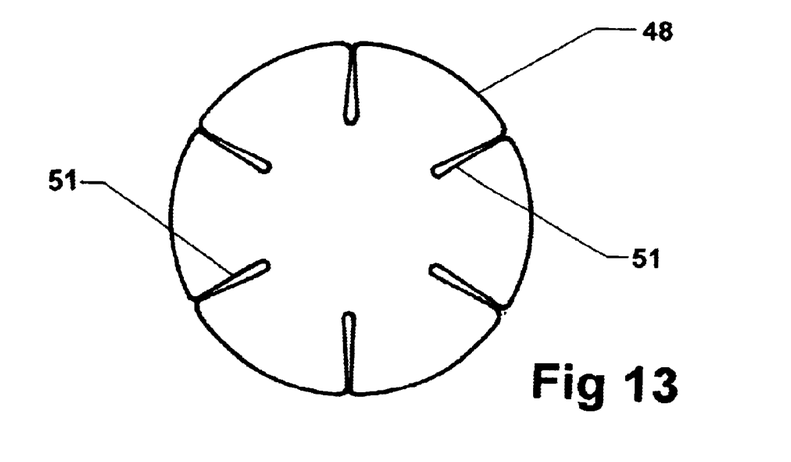
FIG. 13 is a view of the arrangement depicted in FIG. 12 reverted to its cylindrical form.

With reference to FIGS. 12 and 13, in the same alternative embodiment, tube of impregnated reinforcement material 1 is modified by the making of a plurality of short axial cuts in one of its ends, allowing leaves 48 to be folded out radially in the form of a rosette. Gussets 49 are inserted into the openings of approximately triangular shape generated between said leaves when positioned in their rosette arrangement and are sewn or bonded into place. Each said gusset is preferably provided with crease 50 which facilitates its adoption of a folded form 51, thereby offering minimal impedance to the movement of said leaves as they are restored to their original tubular arrangement (as depicted specifically in FIG. 13). In positioning said tube of impregnated reinforcement material over assembly mandrel 2 (as described and depicted in FIGS. 1, 2 and 3), its folded forms 51 are first deflected sidewardly, all in the same sense, to lie flat against the inner surface of said tube of impregnated reinforcement material.

Although in FIGS. 12 and 13, said tube of impregnated reinforcement material is depicted as made from some thin material, it is, in fact, made in whatever thickness is required to effect a repair or reinforcement of the required strength in a particular pipe or conduit.

Figure 8:
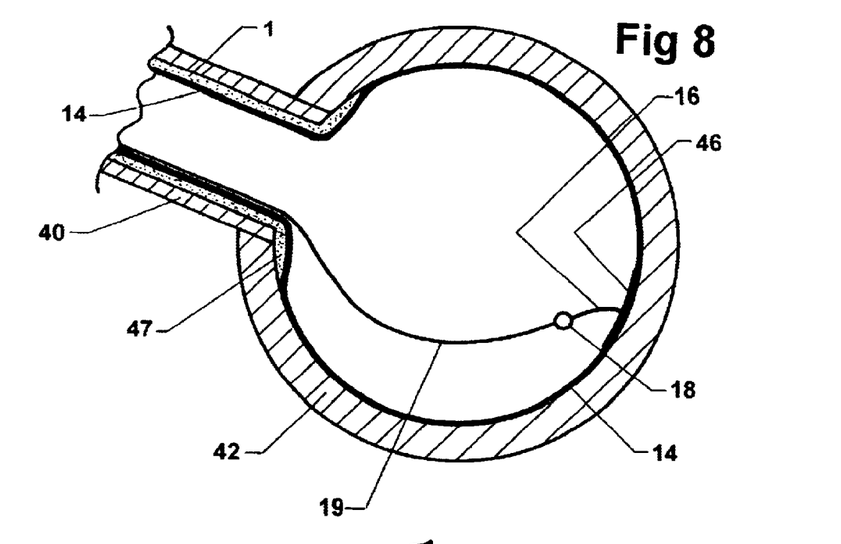
FIG. 8 is a cross-sectional view through the junction of a tributary service connection with a sewer main showing final positioning of the distal end of the installation sleeve in an alternative embodiment of the invention.

With reference to FIGS. 8 and 12, in the same alternative embodiment, tube of impregnated reinforcement material 1 is positioned within installation sleeve 14 such that that part of its end modified to create leaves 48 extends for a short distance over its said distal end adapted to inflate into a more or less spherical form. Following the completion of eversion of said installation sleeve into said lateral service connection (as described and depicted in relation to FIG. 6), said tube of impregnated reinforcement material is positioned so that said leaves and gussets just extend into the lumen of said sewer main and said distal end of said installation sleeve is inflated to fully fill said lumen and thereby open out said leaves and gussets into their rosette form and urge them against the inner surface of said sewer main around the opening of said lateral service connection, forming, when said settable resin with which they are impregnated is cured, flange 47. During said curing process, heated inflation medium flowing along said installation sleeve passes into its said inflated distal end and out through said calibrated vent openings (not shown) in it.

Where said tube of impregnated reinforcement material is suitably elastic, the arrangement depicted in FIGS. 12 and 13 may be dispensed with and said tube of reinforcement material made sufficiently long and is positioned within said installation sleeve such that, when said installation sleeve is fully everted, it projects for a distance of approximately one diameter into the lumen of said sewer main. As said distal end of said inflation sleeve inflates, as depicted in FIG. 8, said projecting end of said tube of impregnated reinforcement material retracts against the inner surface of said sewer main to form a collar around the opening of said lateral service connection which is compressed and flattened as said distal end of said installation sleeve becomes fully inflated. Said flattened collar, when said settable resin with which said tube of reinforcement material is impregnated is cured, serves a similar purpose to that of flange 47 as depicted in FIG. 8.

The advantage of the alternative embodiment depicted in and described in relation to FIGS. 8 to 13 is a repair of said lateral service connection which is more strongly secured in position by flange or flattened collar 47 bearing against the inner surface of said sewer main.

With reference to FIG. 14, in an alternative embodiment, the distal end of said installation sleeve is closed by securing its said layers, 14a, 14b to a waisted plug 54, with removable clamp 55. Said waisted plug is provided with calibrated venting duct 56 passing throughout its length and attachment fittings 57, 58 are pivotally attached to each end of said waisted plug in a way which does not impede flow through said venting duct. Retrieval tape or cord 19 and guide tape or cord 21 are attached to said attachment fittings. This embodiment provides a more convenient method of closing said distal end of said installation sleeve, the effect of said closure method being readily reversible. Obviously, retrieval tape or cord 19 and guide tape or cord 21 may be made in a continuous length and attached jointly to the closed end 15 of said installation sleeve by being seized to waisted plug 54 together with the end of said installation sleeve by clamp 55. In this arrangement, knots might be provided in said tapes or cords immediately adjacent to and on either side of said waisted plug to eliminate the possibility of inadvertent slippage.

The method and apparatus described herein may be readily employed by personnel possessing average skills, and having had reasonable training, to reliably install localised repairs or reinforcements in any location within straight or convoluted pipes or conduits while working from one or more of their ends and without the need to expose or break them.

What is claimed is:

1. A method of installing a formed-in-situ repair in a pipe or conduit comprising:
   a. locating a sleeve of soft reinforcement material impregnated with a settable resin within a tube of soft, impervious sheet material;
   b. everting said tube into said pipe such that said sleeve is carried into a desired zone and brought into intimate contact with its inner surface of said pipe;
   c. guiding a point of eversion of said tube through directional changes in said pipe with guiding means;
   d. maintaining the inflation of said everted tube while passing a heated fluid medium through its interior to accelerate curing of said settable resin; and, when said settable resin is cured, de-everting said tube with withdrawal means and withdrawing said tube from said pipe, leaving said sleeve of reinforcement material in place within said pipe.

2. The method of claim 1 wherein the guiding means is a guide tape attached to said tube, the method further comprising passing said guide tape along the full length of said tube, through said sleeve of reinforcement material and for sufficient distance outside said tube to extend from a proximal end of a section of the pipe to be repaired to its distal end.

3. The method of claim 1 wherein the withdrawing means comprises a retrieval tape of a length slightly greater than the length of said tube, the retrieval tape attached to an external surface of said tube.

4. A method of installing a formed-in-situ repair in a pipe comprising:
   a. locating a sleeve of soft reinforcement material impregnated with a settable resin within a tube of soft, impervious sheet material;
   b. attaching a first tape to an internal surface of a closed end of said tube, said tape passing along the full length of said tube, through said sleeve of reinforcement material and for sufficient distance outside said tube to extend from a proximal end of a section of said pipe to be repaired to its distal end;
   c. attaching a second tape of a length slightly greater than that of said tube to an external surface of said closed end;
   d. winding said second tape followed by said combined sleeve and tube onto a rotatable drum within a pressurizable container, leaving an open end of said tube protruding;
   e. passing said first tape from said pressurizable container along the length of said section of pipe to be repaired to its distal end;
   f. fixing the open end of said tube to an outlet of said pressurizable container and pressurizing an interior of said container, thereby everting said tube directly into said pipe to be repaired such that said sleeve is carried with said tube and, upon inversion, said sleeve is brought into intimate contact with a desired zone of the inner surface of said pipe;
   g. controlling the rotation of said drum to regulate the rate of eversion of said tube;
   h. applying tension to a distal end of said first tape to guide the everting part of said tube through directional changes within said pipe to be repaired;
   i. maintaining the inflation of said tube when everted while passing a flow of a heated fluid medium through its interior to accelerate curing of said settable resin; and, when said settable resin is cured, applying tension to a proximal end of said second tape to de-evert said tube and withdraw said tube from said pipe to be repaired, peeling said tube away from said cured sleeve of reinforcement material which is left in place within said pipe.

5. The method of claim 4 in which said tube is made from a material allowing circumferential elastic expansion of up to 50 percent, but restricting axial elastic expansion to the range 15 to 20 percent.

6. The method of claim 5 in which said tube is formed from a sheet of thin, soft, impervious material into which a large plurality of axially-arranged, fine, parallel, non-elastic reinforcing filaments is incorporated.

7. The method of claim 6 in which said reinforcing filaments follow a more or less sinuous path with an amplitude of approximately two millimeters and a wavelength of approximately six millimeters.

8. The method of claim 6 in which said reinforcing filaments have other amplitudes and wavelengths.

9. The method of claim 5 in which said tube is reinforced by the application to it of a plurality of axially-oriented, narrow strips of self-adhesive, elastic polymer material.

10. The method of claim 9 in which said strips of polymer material are reinforced by the incorporation into said plurality of axially-arranged, fine, parallel, non-elastic reinforcing filaments.

11. The method of claim 10 in which said reinforcing filaments follow a more or less sinuous path with an amplitude of approximately two millimeters and a wavelength of approximately six millimeters.

12. The method of claim 10 in which said reinforcing filaments have an amplitude of two millimeters and a wavelength of six millimeters.

13. The method of claim 4 in which said tube comprises first and second separate layers of thin, soft, flexible, impervious material, the first having a diameter of between 100 and 110 percent of the inside diameter of said pipe and being relatively inelastic, the second having a diameter of between 75 and 90 percent of the inner diameter of said pipe and being sufficiently elastic to permit localized elongation of between 15 and 20 percent.

14. The method of claim 13 in which said first layer is made approximately 0.25 mm thick and said second layer 0.40 mm thick.

15. The method of claim 4 in which said tube is made from reinforced and relatively inelastic material and with a diameter that is within a range that is equal to or slightly larger than the internal diameter of said pipe.

16. The method of claim 4 in which said tube is made by sealingly joining a length of suitably elastic tubing between and to two lengths of relatively inelastic tubing, the diameters of both tubing types being between 90 and 100 percent of the inner diameter of said pipe.

17. The method of claim 4 in which said tube is made from a first tube in the form of single, continuous length of soft, flexible, elastic, impervious material, inside which, prior to its eversion into said pipe, are secured in place two or more lengths of tubing of soft, flexible, relatively inelastic material which cover the whole of the interior of said first tube except for a zone in which said resin impregnated reinforcement is to be located.

18. The method of claim 17 in which an inner and outer tubing comprising said tube are made with a diameter between 90 and 100 percent of the inside diameter of said pipe.

19. The method of claim 4 in which said tube is made from polyethylene or polyvinyl chloride material.

20. The method of claim 4 in which said sleeve of reinforcement material is secured in place within said tube with double-side adhesive tape.

21. The method of claim 4 in which said sleeve of reinforcement material is secured in place within said tube with self-adhesive tape incorporating on its other surface looped and/or hooked filaments, the self-adhesive surface adapted to be applied to the inner surface of said tube.

22. The method of claim 4 in which said settable resin is vinyl ester, polyester or epoxy.

23. The method of claim 4 in which said sleeve of reinforcement material is made from needled polyester felt.

24. The method of claim 4 in which said sleeve of reinforcement material is made directly in the form of a knitted tube or by forming knitted sheet material into a tube.

25. The method of claim 4 in which said pressurisable container is pressurised to between 50 and 150 kPa to cause eversion of said tube in to said pipe.

26. The method of claim 4 in which said tube containing said sleeve of reinforcement material is first rolled onto a drum which is then installed in said pressurizable container.

27. The method of claim 4 in which said drum is left in place inside said pressurizable container and said tube containing said sleeve of reinforcement material is attached to a short bridle attached to said drum and is drawn through an outlet into said pressurizable container and onto said drum by rotation of said drum.

28. The method of claim 4 in which said drum in said pressurizable container is supported on a shaft or shafts rotatable by means of a crank handle or by remotely-controllable, power-operated drive means.

29. The method of claim 4 in which said first tape, or at least that part of it passing through the interior of said tube, is made in the form of a flat tape of width approximately one quarter of the circumference of said tube.

30. The method of claim 4 in which said sleeve of reinforcement material is impregnated with said settable resin prior to said sleeve being positioned within said tube.

31. The method of claim 4 in which said sleeve of reinforcement material is Impregnated with said settable resin after being positioned within said tube.

32. The method of claim 4 in which said closed end and adjacent zone of said tube is reinforced.

33. The method of claim 4 in which calibrated vent openings are provided in the closed end of said tube.

34. The method of claim 4 in which tension applied to the distal end of said first tape causes a wider tape part to press against those parts of bends or convolutions of smaller radius, thereby suppressing any tendency towards pleating of said tube and said sleeve of reinforcement material.

35. The method of claim 4 in which a distal end of said tube is provided with a reinforced ballooning part.

36. The method of claim 4 in which a distal end of said sleeve of reinforcement material is provided with leaves and gussets enabling said distal end to be expanded out into a flange or rosette form.

37. The method of claim 4 in which flow indicating devices are provided in a hose or pressure line through which pressurizing media are supplied to the interior of said pressurizable container and a pressure gauge is provided on said pressurizable container to indicate the pressure within it.

38. The method of claim 4 in which said heated pressurizing medium is steam.

39. The method of claim 4 in which said heated pressurizing medium is water.

40. The method of claim 4 in which said heated pressurizing medium is air.

41. The method of claim 4 in which both heated and unheated pressurizing medium is employed.

42. The method of claim 4 in which the temperature of said closed distal end of said tube is measured by a thermocouple or other heat sensitive device embedded in said closed end and connected to indication means at said pressurizable container by conductors embedded in said second tape.

43. The method of claim 4 in which said closed end of said tube is closed by clamping the walls of said tube to a wasted plug.

44. The method of claim 43 in which a calibrated venting duct is provided passing through the length of said wasted plug.

45. The method of claim 43 in which said first and second tapes or cords are made in a continuous length and seized directly to said wasted plug at the distal end of said tube.

46. The method of claim 4 in which a lubricating compound is applied to the external surface of said tube immediately prior to its eversion into said pipe to be repaired.

47. The method of claim 4 in which tension is maintained on said second tape during the process of curing said settable resin to minimize the elongation of said tube.

48. The method of claim 4 in which a plurality of sleeves of soft reinforcement material impregnated with a settable resin are located within said tube which is then everted into a said pipe to be repaired to bring said sleeves into intimate contact with the inner surfaces of a plurality of desired zones within said pipe.

49. The method of claim 4 in which said sleeve of reinforcement material possesses a degree of elasticity sufficient to permit a localized elongation of up to 20 percent in any plane.

50. The method of claim 4 in which tension is applied as required to a distal end of said first tape during the process of eversion to physically guide the everting zone of said tube and said sleeve around and through directional changes in said pipe, the changes comprising bends, joint displacements or other convolutions, thereby over-coming any tendency for said everting zone to stick or baulk in said directional changes.

51. The method of claim 4 in which a folding device is provided in said outlet of said pressurizable container to reduce said tube and said sleeve to a more compact form.

52. The method of claim 4 in which said tube is employed to accurately locate a short or long sleeve of reinforcement material in a repair zone anywhere within the extended length of a straight or convoluted pipe.

53. The method of claim 4 in which elasticity of said tube and said sleeve of reinforcement material permits localized elastic deformation sufficient to permit said sleeve to accommodate any shape change in said pipe, thereby achieving smooth conformity and avoiding any tendency for said sleeve to pleat.

54. A method of installing a formed-in-situ repair in a pipe or conduit comprising:
  a. locating a sleeve of soft reinforcement material impregnated with a settable resin within a tube of soft, impervious sheet material;
  b. attaching a first tape to an internal surface of a closed end of said tube;
  c. attaching a second tape of a length slightly greater than that of said tube to an external surface of said closed end;
  d. winding said second tape followed by said combined sleeve and tube onto a rotatable drum within a pressurizable container, leaving an open end of said tube protruding;
  e. passing said first tape from said pressurizable container along the length of said section of pipe to be repaired to its distal end;
  f. fixing the open end of said tube to an outlet of said pressurizable container and pressurizing an interior of said container, thereby everting said tube directly into said pipe to be repaired such that said sleeve is carried with said tube and, upon inversion, is brought into intimate contact with a desired zone of an inner surface of said pipe;
  g. applying tension to a distal end of said first tape to guide the everting part of said tube through directional changes within said pipe to be repaired;
  h. maintaining the inflation of said tube when everted while passing a flow of a heated fluid medium through its interior to accelerate curing of said settable resin; and,
when said settable resin is cured, applying tension to a proximal end of said second tape to de-evert said tube and withdraw said tube from said pipe to be repaired, peeling said tube away from said cured sleeve of reinforcement material which is left in place within said pipe.

55. A method of installing a formed-in-situ repair in a pipe comprising:
  a. locating a sleeve of soft reinforcement material impregnated with a settable resin within a tube of soft, impervious sheet material;
  b. attaching a first tape to an internal surface of a closed end of said tube, said tape passing along the full length of said tube, through said sleeve of reinforcement material and for sufficient distance outside said tube to extend from a proximal end of a section of said pipe to be repaired to its distal end;
  c. attaching a second tape of a length slightly greater than that of said tube to an external surface of said closed end;
  d. winding said second tape followed by said combined sleeve and tube onto a rotatable drum within a pressurizable container, leaving an open end of said tube protruding;
  e. passing said first tape from said pressurizable container along the length of said section of pipe to be repaired to its distal end;
  f. fixing the open end of said tube to an outlet of said pressurizable container and pressurizing an interior of said container, thereby everting said tube directly into said pipe to be repaired such that said sleeve is carried with said tube and, upon inversion, said sleeve is brought into intimate contact with a desired zone of the inner surface of said pipe;
  g. controlling the rotation of said drum to regulate the rate of eversion of said tube;
  h. applying tension to a distal end of said first tape to guide the everting part of said tube through directional changes within said pipe to be repaired;
  i. maintaining the inflation of said tube when everted while continuing to pass a flow of medium at ambient temperature through its interior to accelerate curing of said settable resin; and, when said settable resin is cured, applying tension to a proximal end of said second tape to de-evert said tube and withdraw said tube from said pipe to be repaired, peeling said tube away from said cured sleeve of reinforcement material which is left in place within said pipe.

\* \* \* \* \*